J. BOHNER.
Horse Hay Rake.
No. 89,555.
2 Sheets—Sheet 1.
Patented May 4, 1869.
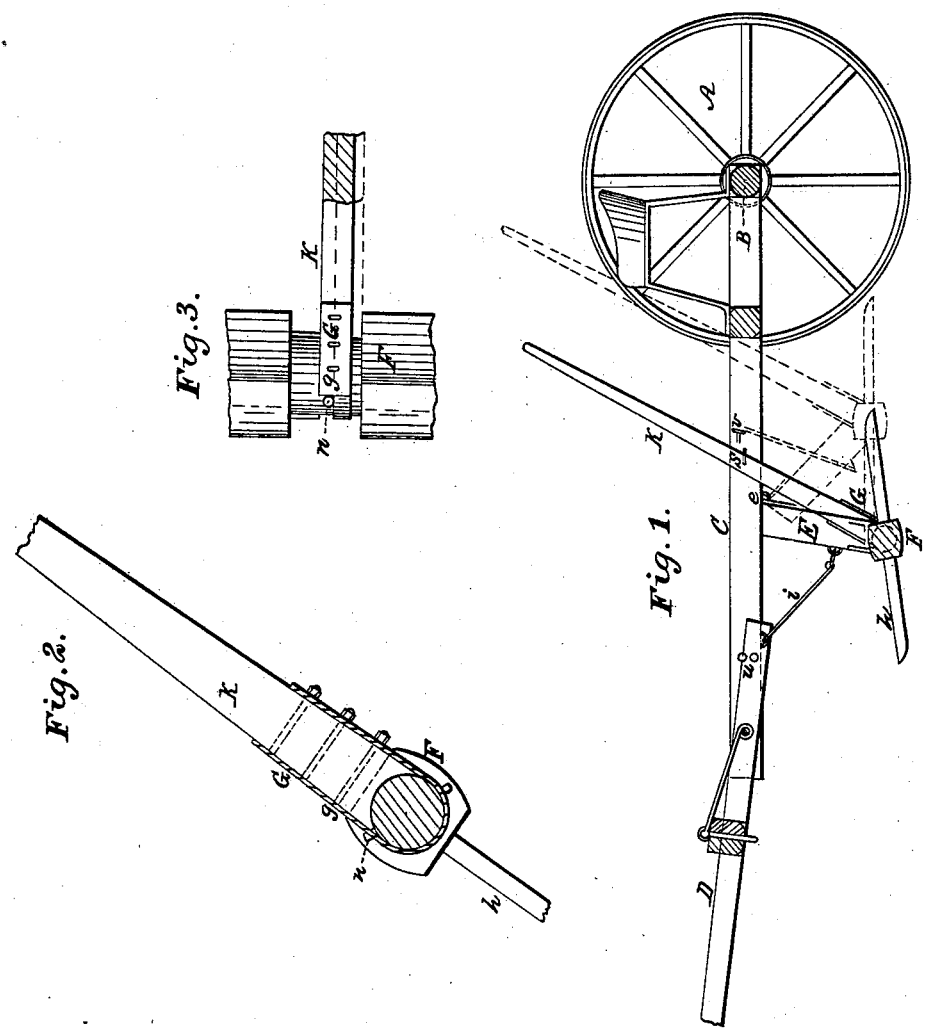

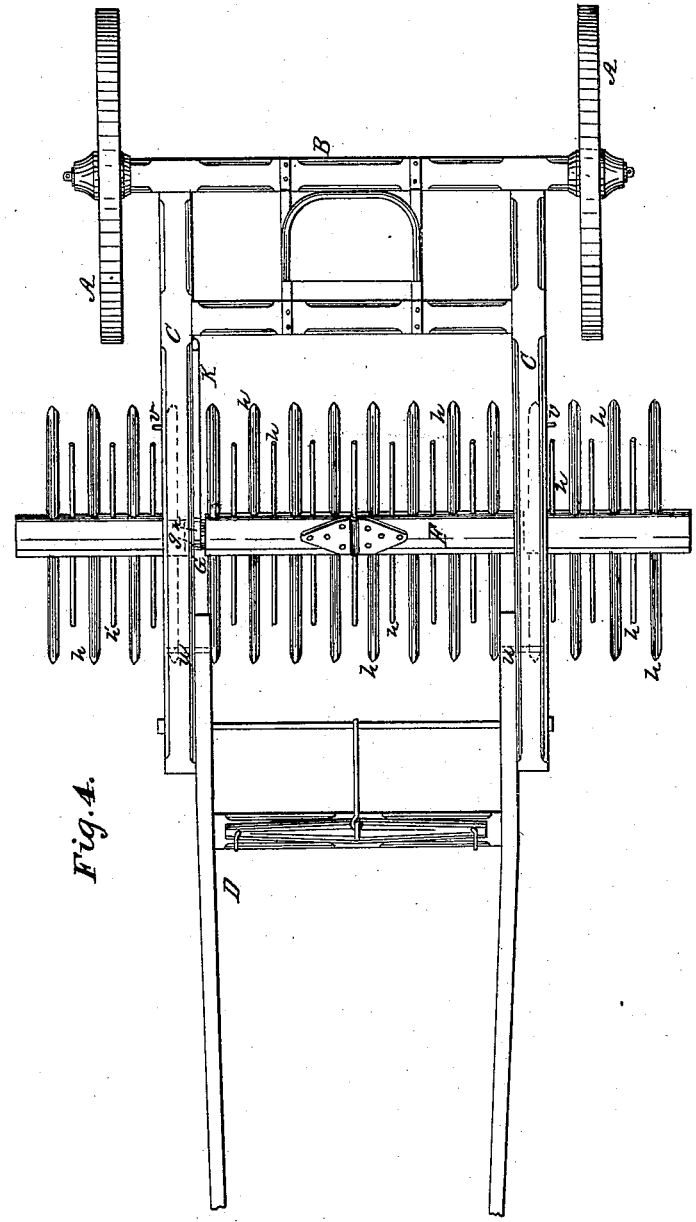

JOSEPH BOHNER, OF ALDEN, NEW YORK.

Letters Patent No. 89,555, dated May 4, 1869.

IMPROVEMENT IN HORSE-RAKES.

The Schedule referred to in these Letters Patent and making part of the same.

*To all whom it may concern:*

Be it known that I, JOSEPH BOHNER, of Alden, in the county of Erie, and State of New York, have invented certain new and useful Improvements in Horse Hay-Rakes; and I do hereby declare that the following is a full and exact description thereof, reference being had to the accompanying drawings, making part of this specification.

My improvements relate to that class of horse-rakes in which straight teeth are arranged in a head so as to project on both sides, which sides are used alternately, the hay at each windrow being discharged by a half revolution of the rake-head.

My invention consists in connecting the rake-head to the main frame, by hinged standards, and providing for a rigid attachment of the thills to the main frame, so that the rake may be raised and supported above the ground, when it is desired to move the machine from place to place without operating.

In the drawings above referred to—

Figure I is a longitudinal vertical section of my improved rake.

Figure II is a cross-section of the rake-head, showing the ratchet-connection of the operating-lever therewith.

Figure III is a plan of the said connection.

Figure IV is a plan of the machine.

Like letters of reference designate like parts in each of the figures.

A A represent the two wheels of a truck.

B, the axle.

c c, two parallel pieces, or timbers of a frame attached to the axle, and extending in front, to which the thills D are hinged.

E E are two standards, hinged at e to the frame-pieces C.

F is the rake-head, secured to the ends of the standards by straps fastened to the sides of the latter, and passing around the rake-head, so as to form bearings for it as it revolves.

This head is hinged at the centre, as shown, for the purpose before stated.

h h are the ordinary wooden teeth, and h' h' intermediate short ones, represented as made of iron.

The standards E are provided with braces i i, consisting of an iron hook, which engages with a staple, j, in the under side of the pieces C, and in front of the standards.

K is a lever, the end of which connects with the rake-head by a strap, G, in a manner similar to that of the standards E.

This strap is provided with a ratchet, g, which engages with a pin, n, projecting from the head, so that when the lever is moved forward it will depress the forward teeth, and cause the rake to make a half revolution, sufficient space being left between the pin n and the shoulder of the head, to permit the movement in that direction.

A pin, s, projects inward from the piece c, on that side of the machine where the lever is arranged, and forms a rest for it when its use is not required in travelling from one windrow to the other.

The ends of the thills extend back beyond the coupling, and have a hole, u, formed through them, with one in the frame-pieces C corresponding therewith, through which is inserted a pin, when it is required to render the connection rigid, as is the case in travelling to and from the field.

For this purpose the braces i are detached from the staples in front, and the rake-head brought back, so as to be supported in a raised position by the hooks i, engaging in staples v, back of the standards, as shown in red lines, Fig. I, the rigid coupling of the thills preventing the subsidence of the end of the frame C.

It is evident that the general operation of my machine is similar to that of the common revolving rake, the revolution of the rake-head being effected by means of the lever K, as before described.

The effect and importance of the hinging of the rake-head, when used on uneven ground, as well as the other features of my invention, are sufficiently obvious, without further description.

What I claim as my invention, and desire to secure by Letters Patent, is—

The rake-head F, standards E, hinged to the main frame C, and provided with brace-hooks i, in combination with the hinged thills D, having rearward extensions and locking-pins u, arranged and operating substantially as and for the purpose herein described.

JOSEPH BOHNER.

Witnesses:
A. BOHNER, Jr.,
SPENCER J. FULLER.